July 7, 1959  J. W. SHEEHAN  2,893,199
APPARATUS FOR INTERNAL FORGING OF CHAIN LINKS
Filed May 19, 1955  2 Sheets-Sheet 1

INVENTOR:
James W. Sheehan
BY
Lynn H. Latta
ATTORNEY.

July 7, 1959 J. W. SHEEHAN 2,893,199
APPARATUS FOR INTERNAL FORGING OF CHAIN LINKS
Filed May 19, 1955 2 Sheets-Sheet 2
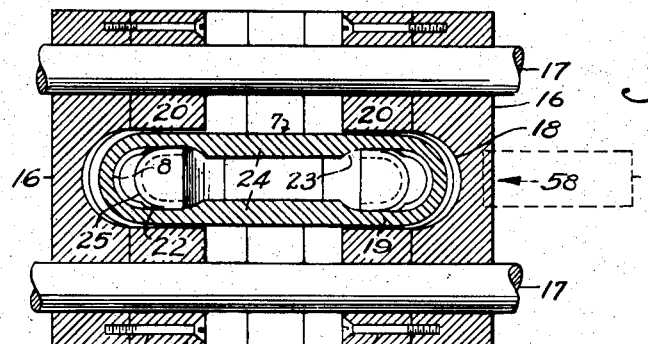
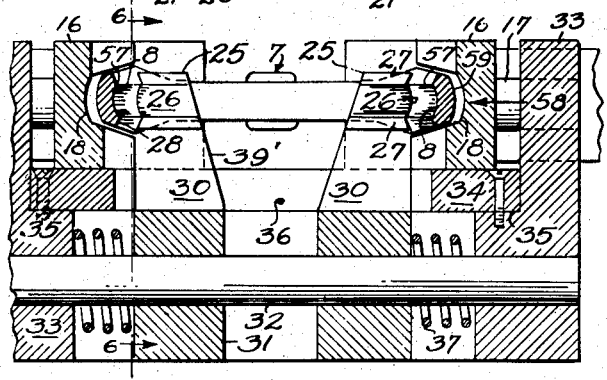
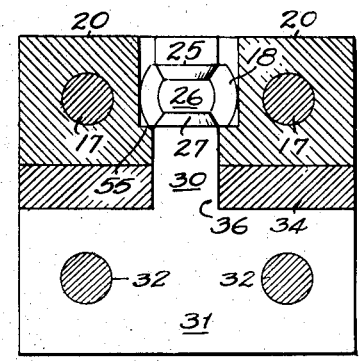
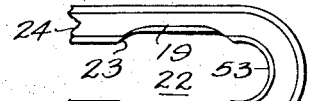
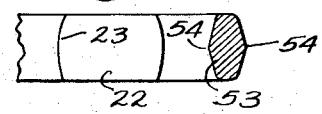
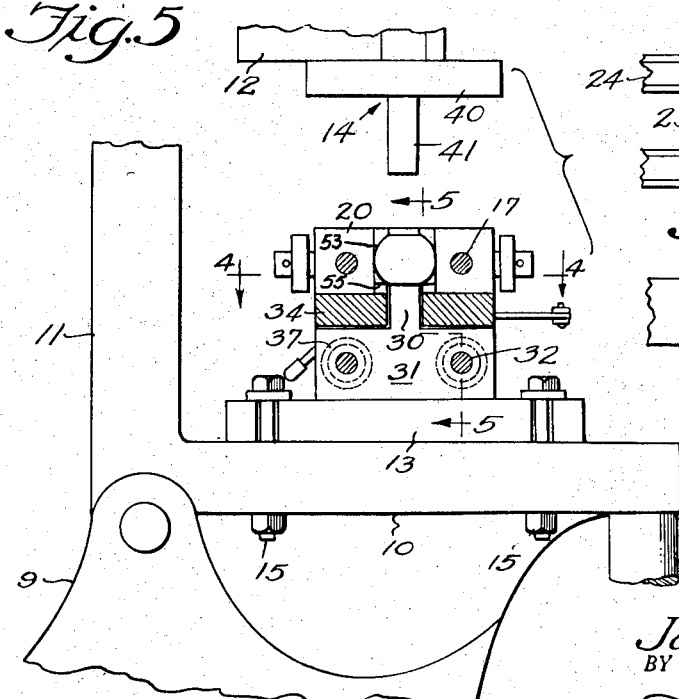
INVENTOR.
James W. Sheehan
BY
—ATTORNEY—

United States Patent Office 2,893,199
Patented July 7, 1959

2,893,199

APPARATUS FOR INTERNAL FORGING OF CHAIN LINKS

James W. Sheehan, Pacific Palisades, Calif.

Application May 19, 1955, Serial No. 509,484

3 Claims. (Cl. 59—30)

This invention relates to the art of forging loop shaped metal articles. It deals particularly with the forging of conveyor chain links of a type having internal concave spherical bearing seats or sockets, and has as its general object to provide an apparatus whereby such sockets may be forged in a conveyor chain link.

At the time the present invention was proposed, experts in the forging art and in the conveyor chain art were of the opinion that to forge internal spherical sockets in the ends of a conveyor chain link would be impossible. In spite of this opinion, the present invention has provided an apparatus whereby the internal forging of spherical sockets can not only be successfully effected, but at a minimum of expense and while holding dimensions within close tolerances.

Since the spherical bearing sockets cooperate with ball elements of the connecting pins of a conveyor chain to provide for universal pivotal movement, within limits, between the links of the conveyor chain, dimensional stability is an absolute requirement. Accordingly, one of the primary objects of my invention is to provide an apparatus by which internal spherical sockets can be forged accurately. A further object is to provide such an apparatus which will operate effectively within close tolerances in reproducing large numbers of articles, i.e., which will maintain close tolerances in production operation.

An important element of any industrial operation is of course the element of cost. When the particular conveyor chain link which is produced by the present invention was first envisioned, it was assumed that a milling or machining operation would have to be utilized in order to produce with satisfactory accuracy the bearing sockets in the ends of the link. Such a machining operation not only would be expensive, but would cut the grain of the metal so as to leave surfaces having unsatisfactory wear-resisting qualities, and therefore one of the important objects of the invention is to provide means for producing these bearing sockets relatively inexpensively and at the same time in such a manner as to produce hard, dense surfaces, highly resistant to wear. The invention has achieved that object in providing a method and apparatus capable of internally forging the bearing sockets in rapid succession. In general, this has been accomplished by providing an apparatus to effect a series of steps including (1) an initial forging step in which the general shape of the link, in rough form, is imparted; (2) a cleaning step to remove scale; (3) reheating the forged link preparatory to the internal forging operation; (4) hot forging the internal sockets; and (5) simultaneously supporting the external end surfaces of the link against deformation resulting from the forging pressure applied to the inner end surfaces, and reshaping said external surfaces to their final shape.

This invention is directed particularly to the fabricating of the central links of the conveyor chain disclosed in my U.S. Patent No. 2,600,174, issued June 10, 1952. The present invention provides an important improvement in the chain, in the utilization of spherical end surfaces on the center link, said end surfaces bearing against the teeth of a drive sprocket with a bearing engagement that transmits the driving forces of the sprocket teeth directly to the centers of the connecting pins of the chain, without developing any appreciable lateral movements of force tending to tilt the link in one direction or the other from its line of driving forces. Such lateral moments of force cause the links of conventional chains to assume canted positions along the line of drive and often result in breakage of links. In my improved chain the end bearing surfaces of the links are spherical and coaxial with the internal spherical bearing surfaces thereof, and as a result, the above described difficulties are avoided.

It is not practicable to shape the end surfaces of the link to this spherical shape in the initial forging step, since to attempt to do so would cause the forgings to adhere to the die members. This invention provides a fabricating apparatus wherein, in the initial forging step, the end surfaces of the links are shaped with conventional draft angles (e.g. seven degree conical departure from cylindrical shape) on either side of a parting plane. The utilization of the draft angle facilitates the forging of the links with maximum ease and provides for ready removal of the links from the forging dies. These seven degree draft angles are observed not only externally but also internally, including the inner end areas of the links which later are formed with the spherical sockets. That is to say, in the initial step, these inner end surfaces are convex in contrast to their final concave form. In the final step, these convex inner end surfaces are changed to the concave spherical bearing surfaces. This requires moving an appreciable amount of metal, and one of the important objects of the invention is to do this with a minimum of strain upon the dies, with a minimum power requirement, and with maximum speed and accuracy. The invention achieves these results by utilizing clearance spaces (between the initial frusto-conical draft angle end surfaces of the link and the spherical female die recesses which give the end surfaces their final shape) to receive the metal that is pushed outwardly in the forming of the bearing sockets. Accordingly, the bearing sockets are formed simultaneously with the reshaping of the outer end surfaces of the links, so that the necessity for coining or extruding metal laterally is reduced, and the shaping of the bearing sockets is a hot forging step in which the metal is pushed radially outwardly to fill the die recesses which shape the outer end surfaces of the links. As contrasted to the common coining or extruding operation in which the metal must be subjected to extremely high pressures to cause it to actually flow, the final step of operation is one in which the forging action involves a substantial element of shaping or forming (bending) action.

One of the important objects of the invention is to provide a forging apparatus by the use of which it becomes possible to hold chain pitch to much closer tolerances than have hitherto been possible. This is accomplished through control of the spacing of the spherical end bearing surfaces of the link, in the final re-shaping operation against these end bearing surfaces. By holding closer pitch tolerances, I provide a chain which is smoother in operation and much less subject to fluctuating strains thereon in operation—therefore less vulnerable to wear.

Another object of the invention is to provide an improved conveyor chain of the universally pivotal type having links, the outer end faces of which are spherical so as to receive the driving pressure of sprocket teeth without developing any substantial lateral component of force such as would tend to cant the link away from its line of drive.

Other objects will become apparent in the ensuing specifications and appended drawings in which:

Fig. 3 is a sectional view taken on the line 3—3 of Fig. 2;

Fig. 4 is a detail sectional view of a central portion of the apparatus taken on the line 4—4 of Fig. 3;

Fig. 5 is a detail sectional view of the same taken on the line 5—5 of Fig. 3;

Fig. 6 is a detail sectional view of the same taken on the line 6—6 of Fig. 5;

Fig. 7 is a partial plan view of the link blank prior to reshaping;

Fig. 8 is a sectional view of the link blank prior to reshaping; and

Fig. 9 is a partial side view of the finished link.

The chain

Figure 1:
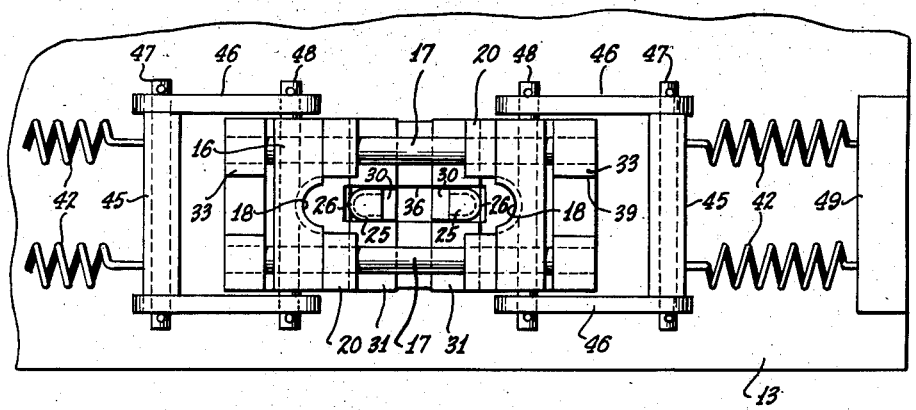
Fig. 1 is a plan view of the apparatus of my invention.

The particular chain link for which the present apparatus is especially adapted, is the center link (indicated generally at 7) of the chain which forms the subject matter of my above identified patent, i.e., a universally pivotal chain comprising a series of such center links, a pair of side links for each center link, and pivot pins for joining the links in end to end succession, with the center links disposed between pairs of side links and the pivot pins having central ball elements that bear in spherical bearing sockets 8 in the respective ends of the links 7. Fig. 9 illustrates the final spherical shape (indicated at 59) of the outer end bearing surface of the link 7, against which sprocket teeth may bear so as to transmit driving force radially to the center of pivotal movement of the link on a connecting pin, avoiding any lateral components of force that in an ordinary chain tend to cant the links out of the line of drive and thereby greatly increase the strain thereon.

The apparatus

As an example of one form of the apparatus that may be utilized in carrying out the invention, I have shown in Figs. 1–6 of the drawing a reshaping apparatus applied to a punch press having a base 9, a bed 10 supported thereon, and a ram 12 which is reciprocated vertically by power mechanism (not shown). My improved apparatus includes two assemblies, namely a lower die assembly the parts of which are mounted on a shoe 13, and a reciprocating actuator cam unit, which is mounted on the ram 12 and is indicated generally by the reference numeral 14. The shoe 13 is fastened upon the bed 10 in a conventional manner by anchor bolts 15.

The die assembly includes a pair of opposed female die blocks 16 slidably mounted on a pair of parallel rails 17 and each having a die recess 18 to shape an end of the chain link.

Lateral support is given to the thinner portions 19 of the side arms of links 7 by means of a pair of side bucking blocks 20, secured, as by means of screws 21, to each die block 16 in laterally spaced arrangement, the space between the blocks 20 registering with the mouth of recess 18.

The thin arm portions 19 of the link define elongated openings 22 extending from the bearing sockets 8 to shoulders 23 (extremities of the central thicker portions 24 of the side arms). The inner walls of thinned portions 19 are convex, parallel, and tangent to the major circumference of sockets 8. This makes it possible to introduce into openings 22 a pair of forging heads 25, each having a spherical peen 26 for shaping a socket 8, and conical or bevelled faces 27 for shaping beveled faces 28 at the edges of the bearing socket 8. The major width of a forging head 25 is just slightly less than the width of an opening 22 as it exists in the rough-forged blank, so that the heads may freely slide into openings 22 as the link 7 is dropped downwardly into the die from above.

Forging heads 25 are formed on the upper ends of posts 30 each of which constitutes a relatively narrow portion of a male forging unit of inverted T-shape, and projects upwardly from the center of a crosshead 31 that constitutes a relatively broad base portion of such unit, and is slidably mounted on rails 32. Rails 17 and 32 are mounted at their ends in brackets 33 which at their lower ends are attached to the mounting shoe 13. Intermediate their ends, the brackets 33 are connected by a bridge plate 34 which is seated upon shoulders 35 in the respective brackets. The bridge plate 34 not only acts as a brace between the brackets 33, but also serves as a guide for the forging heads 25, which are embraced between the walls of a slot 36 extending longitudinally therein.

In the normal, inoperative positions of forging heads 25, shown in Figs. 1, 4 and 5, the heads are withdrawn toward each other from the bearing sockets 8. In the forging operation, they move away from each other into engagement with the inner end walls of the link 7, against the yielding resistance of coil springs 37 which encircle the guide rails 32 and act under compression between the brackets 33 and the crossheads 31, tending to move the forging heads toward each other to their inoperative positions.

The forging heads 25 are moved to their operative positions by a wedge shaped actuator cam 38, the sides of which engage inclined cam faces on the backs of the respective forging heads 25. The actuator cam 38 is mounted on the bottom of a crosshead 40 which in turn is mounted on ram 12. Projecting downwardly from the ends of crosshead 40 are a pair of bucking jaws 41 which are received in central recesses 39 in brackets 33, and engage the backs of female die blocks 16 as indicated in dotted lines in Fig. 4 and force them against the outer end faces of the link 7 to shape said end faces to their finished contours and dimensions.

Movement of the die blocks 16 back and forth between their operative positions engaging the ends of links 7 and their inoperative positions withdrawn from the ends of the links, is effected by the cooperative action of bucking blocks 41 and two pairs of coil springs 42, exerting a pull against respective yokes 45, to which pairs of links 46 are pivotally connected by pivots 47 and are pivotally connected to the ends of a respective die block 16 by pivots 48. Coil springs 42 have their outer ends anchored to brackets 49 which are mounted on shoe 13. The coil springs are extended under tension.

Operation of the apparatus

In the process of fabricating a conveyor chain link in accordance with my invention, the link 7 is first forged in an initial forging step in which it is given the rough shape shown in Figs. 7 and 8. Instead of the sockets 8, there is a semi-circular ridge 53 terminating at the outer extremities of the openings 22. The entire outer periphery of the link, the openings 22, shoulders 23 and inner faces of the thickened central arm portions 24 are shaped with a conventional draft angle (ordinarily about seven degrees). That is, the inner and outer faces of the link are each defined by two surfaces which cooperatively define a dihedral angle the apex of which constitutes a parting line. The parting lines are indicated at 54 in Fig. 8, which shows the rough forged link prior to the finishing step. It will be noted that the cross section of the end of the link indicates pairs of frustoconical surfaces intersecting at the parting line, whereas in the finished link shown in Figs. 4, 5 and 9, the end surfaces 59 are spherical (convex and concave respectively). The initial forging operation is of a conventional nature, utilizing opposed forging dies which meet at a parting plane which constitutes the general plane of the link (at right angles to the axes of openings 22). Since these forging dies move in a direction parallel to the axes of openings 22, it is obviously impossible for them to form the bearing sockets 8. The surfaces of ridges 53 are therefore of convex cross sectional shape, as shown in Fig. 8, instead of the concave shape of sockets 8.

In the next step, the link 7 is allowed to cool and it is then immersed in a cleaning bath to remove scale.

In a succeeding step, the cleaned link is reheated to a cherry red but without reaching a temperature sufficient to cause it to lose its shape. As soon as the link is heated to the proper temperature, the workman grasps it with a suitable pair of tongs and transfers it to the finish-forging apparatus shown herein. Care is taken to see that the die blocks 16 are withdrawn to their inoperative positions, and the ram 12 is of course in the elevated position. The link 7 is fitted into the spaces defined between the retracted forging heads 25, die block sockets 18 and lateral support blocks 20. The shoulders 55 engage the under edges of side arms 24 of the link 7, and support the link at a fixed height when the die heads subsequently advance into engagement with the ends of the link.

After the workman is sure that this link is properly bottomed, he operates the punch press to cause ram 12 to descend, bucking jaws 41 effecting a camming action against the die blocks 16, moving them into engagement with the ends of the link. This is the next step of the process, the advancing movement of die blocks 16 being accurately gaged by the camming action so that the advancing movement of die blocks 16 is arrested at exactly the proper position to cause the walls of die recesses 18 to snugly engage the ends of the links 7, applying deforming pressure thereto.

In the same step of the process, the forging heads 25 are moved apart by cam 38 into engagement with the ridges of metal 53 in the ends of the link 7, to forge the replicas of faces 27 and 26 in the ridge 53 which provides just sufficient metal for extrusion into the furrows between faces 26 and 27, leaving the bearing sockets 8 and relief faces 28 accurately formed and intersecting each other in sharply defined ridges 57.

The re-shaping operation is effected by a single blow of each forging head 25, produced by forcing the actuating cams 38 downwardly between the cam faces 39' of the forging heads, in a descending movement of ram 12. As the forging heads are moved apart, the bucking jaws 41 will force the die blocks against the outer end faces of the link, shaping them to their spherical contour. The operation is carried out without in any way distorting the link from its true shape.

Figure 2:
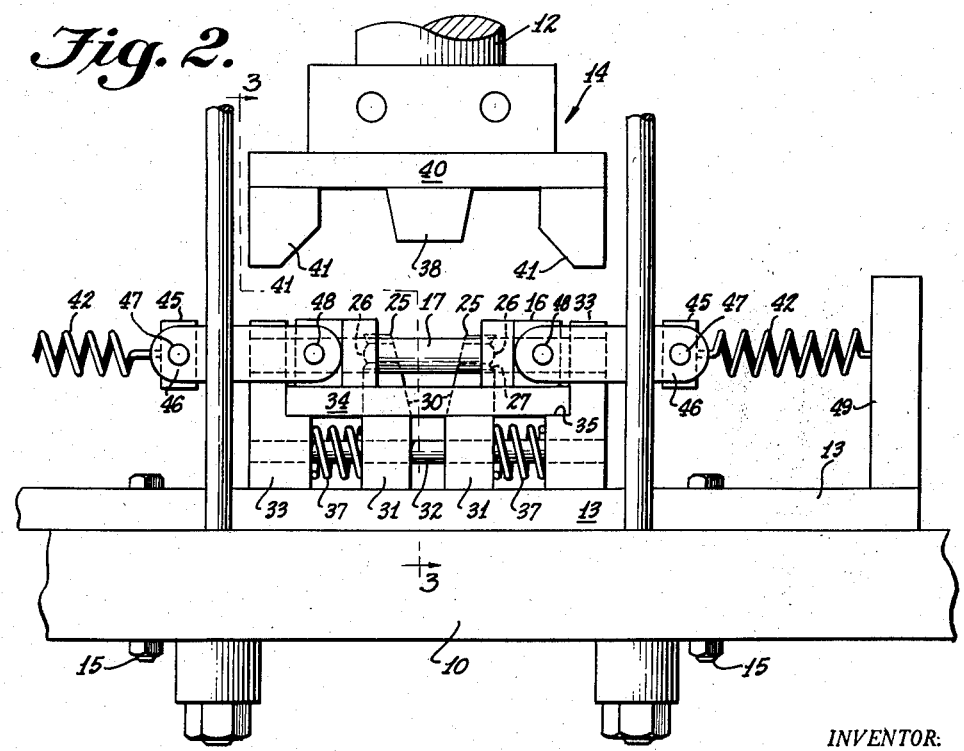
Fig. 2 is a front view of the same.

The press ram 12 is allowed to complete one full cycle of movement (descending movement followed by an upward withdrawal) which allows the forging heads 25 to be retracted by springs 37 to the positions shown in Fig. 4, in which they allow the extremities of sockets 8 to clear them as the link 7 is lifted out of the die assembly. At the same time, bucking jaws 41 are retracted upwardly, allowing springs 42 to withdraw the die blocks 16 to the inoperative positions. These positions are somewhat farther apart than those shown in Figs. 4 and 5, which show the die blocks in intermediate stages of movement toward each other, as indicated by arrows 58. The completely retracted positions are shown in Figs. 1 and 2. The link is then lifted from the re-shaping apparatus. This becomes possible because the forging heads 25, in their retracted positions, will clear the extremities of ridges 57 which define the sides of the sockets 8. The workman then inserts a fresh link in the re-shaping apparatus and the above described cycle of operation is repeated.

It will be apparent from the foregoing that each re-shaping operation involves simply a single stroke of a punch press. Aside from the time consumed by the cycling of the press, the speed with which the sockets may be forged in the links is therefore limited only by the speed at which the operator can insert the links into the re-shaping apparatus and remove them. Access to the inner end walls of the links is gained by first effecting relative movement between the links and the forging heads in a direction parallel to the axes of openings 22 while the forging heads are centered in the openings 22; then effecting movement of the forging heads 25 longitudinally of the links, from the openings 22 into the end spaces within the links; then forging the sockets; then withdrawing the heads in the opposite directions back into registry with the openings 22; and finally withdrawing the link by effecting relative movement between the forging heads and link in a direction parallel to the axes of openings 22. Adequate forging pressure is derived from powerful blows of a punch press ram, multiplied by the camming action of cams 38 against cam faces 39'. Thus the cams 38 function not only to effect the spreading movement of forging heads 25 which is essential to bring them into engagement with the ends of the links, but also to multiply the pressure of the blow delivered by the ram in order to obtain adequate pressure. Distortion of the link under these heavy pressures is avoided by completely supporting the ends of the link in the embrace of die recesses 18 and lateral bucking blocks 20, backed up by the bucking jaws 41.

It is to be understood that by making the guide rods 32 and the bearings in the crossheads 31 sufficiently sturdy and large in area, it may be possible to eliminate the upper guide rods 17. Thus the elements 17 may be regarded as improvements in the basic structure but not completely essential elements.

I claim:

1. Apparatus for forging a pair of spherical sockets in the internal end surfaces of a conveyor chain link having end loops and thickened central arm portions the ends of which are in the form of shoulders cooperating with said end loops to define a pair of elongated openings the end extremities of which are defined by said internal end surfaces, said central arm portions defining between them a central space of less width than said openings, said apparatus comprising: a pair of end brackets; a pair of rails secured to and extending longitudinally between said end brackets in laterally spaced parallel relation in a common horizontal plane; a bridge plate secured to and extending longitudinally between said end brackets above said rails and parallel to said plane, said bridge plate having a slot extending along the longitudinal axis of the apparatus; a pair of guide rods secured to and extending longitudinally between said end brackets above said bridge plate; a pair of male forging units each comprising a relatively broad cross head having a pair of laterally spaced bearing bores through which said rails extend for guiding said cross head for longitudinally approaching and receding movements; forging finger formed integrally with and extending upwardly from each respective cross head through said bridge plate slot and laterally supported and guided therein and having a forging head at its upper end; a pair of female die blocks each having a pair of laterally spaced bearing bores through which said guide rods extend for guiding said die blocks in approaching and receding movements; said forging heads each having a forging face corresponding to the shape of the socket to be forged and a thickness greater than the width of said central space of the link; said die blocks each having a U-shaped recess for shaping a respective external end surface of the link and each having, at the bottom of its recess a pair of laterally spaced supporting shoulders for supporting respective side portions of the link with said internal and external end surfaces thereof in registration with said forging heads and female die recesses respectively; yielding means acting between said end brackets and the respective cross heads for yieldingly urging the latter toward one another and normally maintaining said forging heads in position to pass through said end openings of the link as the latter is inserted into the apparatus; means acting yieldingly against said female die blocks for normally spreading them to positions for freely receiving the end loops of the link; and means for simultaneously spreading said forging heads and drawing said female die block inwardly for forging engagement with said internal and external end surfaces of the link respectively.

2. Apparatus as defined in claim 1 wherein said first mentioned yielding means comprises coil springs encircling said rails and engaged under compression between said end brackets and said cross heads; and wherein said second mentioned yielding means comprises tension springs; anchor members to which the outer ends of tension springs are attached; and links connecting the inner ends of said tension springs to the respective die blocks.

3. Apparatus for forging a pair of spherical sockets in the internal end surfaces of a conveyor chain link having end loops and thickened central arm portions the ends of which are in the form of shoulders cooperating with said end loops to define a pair of elongated openings the end extremities of which are defined by said internal end surfaces, said central arm portions defining between them a central space of less width than said openings, said apparatus comprising: support means having longitudinally spaced supporting parts; a bridge plate secured to and extending between said supporting parts in a horizontal plane and having a pair of opposed bearing walls defining a guide slot extending along the longitudinal axis of the apparatus; a pair of male forging units of inverted T-shape each including a relatively broad horizontally extending cross head as a base portion thereof and a relatively narrow finger projecting upwardly therefrom through said slot and laterally supported by said bearing walls and guided in said slot, said cross head including portions extending laterally beneath said bridge plate on respective sides of said slot, said finger having a forging head corresponding to the shape of the socket to be forged and having a thickness greater than the width of said central space; means beneath said bridge plate slidably mounting and guiding said cross heads with said forging units in opposed relationship for receding and advancing movement with reference to each other along a longitudinal axis; said forging heads when retracted being positioned to enter said openings in the link while spaced from said internal end surfaces; a pair of female die blocks each having a U-shaped recess for shaping a respective external end surface of the link and each having, at the bottom of said recess, on respective sides thereof, a pair of laterally opposed shoulders for supporting said end loops at respective sides thereof adjoining said thickened central arm portions of the link; a spreading wedge insertable into said central space of the link for engagement with said forging heads to spread them into engagement with said internal end surfaces of the link to forge said sockets; a pair of bucking jaws in spaced relation to respective sides of said spreading wedge along a common longitudinal axis, for engagement with the backs of said female die blocks to move them inwardly into engagement with the external surfaces of said end loops for reshaping said external end surfaces while supporting said end loops against the forging pressure of said forging heads; and a common support to which said wedge and jaws are rigidly attached, said common support functioning for moving said wedge and jaws into engagement with said forging heads and female die blocks, under the force of a blow delivered by a punch press.

References Cited in the file of this patent

UNITED STATES PATENTS

| 350,859 | Anderson | Oct. 12, 1886 |
| 1,468,549 | Wootten | Sept. 18, 1923 |
| 1,706,910 | Wright | Mar. 26, 1929 |
| 1,806,733 | Bell et al. | May 26, 1931 |
| 1,979,592 | Weiss | Nov. 6, 1934 |
| 2,373,440 | Winter | Apr. 10, 1945 |

FOREIGN PATENTS

| 294,486 | Germany | Oct. 10, 1916 |
| 696,064 | France | Dec. 26, 1930 |